(12) United States Patent
Sakamoto et al.

(10) Patent No.: US 8,952,589 B2
(45) Date of Patent: Feb. 10, 2015

(54) ROTATING ELECTRICAL MACHINE

(71) Applicant: Nippon Piston Ring, Co. Ltd., Saitama (JP)

(72) Inventors: Masafumi Sakamoto, Saitama (JP); Shigeyoshi Sato, Saitama (JP); Shunsuke Takeguchi, Saitama (JP)

(73) Assignee: Nippon Piston Ring Co., Ltd, Saitama (JP)

( * ) Notice: Subject to any disclaimer, the term of this patent is extended or adjusted under 35 U.S.C. 154(b) by 261 days.

(21) Appl. No.: 13/719,946

(22) Filed: Dec. 19, 2012

(65) Prior Publication Data

US 2013/0187488 A1    Jul. 25, 2013

(30) Foreign Application Priority Data

Dec. 20, 2011 (JP) .................................. 2011-278124
Dec. 18, 2012 (JP) .................................. 2012-275600

(51) Int. Cl.
*H02K 1/06* (2006.01)

(52) U.S. Cl.
USPC .................................. 310/216.074; 310/106

(58) Field of Classification Search
CPC ...... H02K 1/06; H02K 2201/03; H02K 21/22
USPC ............ 310/266, 267, 268, 216.001–216.137
See application file for complete search history.

(56) References Cited

U.S. PATENT DOCUMENTS

| | | | | |
|---|---|---|---|---|
| 5,777,421 | A * | 7/1998 | Woodward, Jr. | 310/268 |
| 6,870,295 | B2 * | 3/2005 | Lim et al. | 310/216.001 |
| 7,825,559 | B2 * | 11/2010 | Nakahara et al. | 310/156.48 |
| 2008/0284267 | A1 * | 11/2008 | Purvines | 310/112 |

FOREIGN PATENT DOCUMENTS

WO    2010/116921 A1    10/2010

* cited by examiner

*Primary Examiner* — Hanh Nguyen
(74) *Attorney, Agent, or Firm* — Sughrue Mion, PLLC

(57) ABSTRACT

In a rotating electrical machine of axial-gap type in which a stator and a rotor are opposed to each other in arrangement and winding axis is parallel with a rotating shaft direction, the stator has an "m" protruding in the rotating shaft direction are distributed along a circumferential direction thereof, in which the winding pole is formed of a magnetic member having a plurality of teeth in a circular-arc shape in a diameter direction, and wherein the rotor is formed of a magnetic member having a plurality of teeth in a circular-arc shape in a diameter direction, and the number of the teeth of the stator and the rotor are arranged in a manner opposite to each other through air gap so as to be engaged with each other. The stator and the rotor are opposed on both sides of the rotor and the stator.

9 Claims, 6 Drawing Sheets

ROTATING ELECTRICAL MACHINE

BACKGROUND OF THE INVENTION

1. Field of the Invention

The present invention relates to an axial-gap type rotating electrical machine.

2. Background Technology

Conventionally, commercial market has required for a rotating electrical machine such as electric motor or electric generator to be thin and compact in size or structure, and particularly, in these days, as a countermeasure to global warming tendency, requirement for energy saving and high efficiency has been increased. Moreover, it has been further strongly required for the rotating electrical machine to have low vibration and low noise as well as cheap cost.

A conventional technology related to a general axial-gap type rotating electrical machine provides an effective structure for making flat and thin, and when a rotor is formed into disc shape, an inertia is made small, so that such rotating electrical machine is effective for a constant speed operation and variable speed operation, which has been therefore attractive to attention in these days. However, in comparison with a radial-gap type rotating electrical machine, it is difficult to make small the air-gap, which adversely affects on high torque requirement and high efficiency requirement.

On the other hand, the following patent document has been provided as a technology for achieving related high torque by increasing an opposing area.

PRIOR ART DOCUMENT

Patent Document

[Patent Document 1] WO2010/116921 A1

DESCRIPTION OF THE INVENTION

Problems to be Solved by the Invention

Rotating electrical machines will be classified into radial-gap type and an axial-gap type.

In a technology in a case of a conventional general radial-gap type rotating electrical machine such as a brushless DC rotating electrical machine (called hereinafter "BLDC motor") or synchronous generator using a permanent magnet for a rotor, and a switched reluctance rotating electrical machine (called hereinafter "SR motor") using no permanent magnet and using magnetic teeth as a rotor, a stator core is composed of laminated silicon steel plates, and in addition, in a case when cost reduction and operational efficiency are weighed, a concentrated winding method or manner has been adopted. This is based on a reason in which even if a distributed winding method or manner is adopted, a coil end portion that does not contribute to torque generation becomes large and copper loss is increased, leading to lowering in efficiency, and a reason in which, in the concentrated winding method, winding process becomes simple and direct winding to a slot becomes possible, which leads to cost reduction for windings. In the concentrated winding method, when constructed practically, the number of slots of the stator is limited to about 4 to 12.

Further, there is provided the above Patent Document 1, which aims to realize high efficiency in a rotating electrical machine and discloses means for increasing opposing area of an air-gap portion of the stator and the rotor. Such prior technology is disclosed as an SR motor realizing high torque as an example represented in FIGS. 7(a) and (b) of the Patent Document 1. However, the air-gap does not indicate a linear development in a rotating shaft direction, and a rotating electrical machine is composed though engagement of protruded portion and recessed portion. Because of this reason, the opposing area of actual air-gap increases, leading to realization of high torque and high efficiency. However, in such rotating electrical machine, the air-gap is not linearly formed, it is difficult to separately manufacture the stator and the rotor, to insert the rotor into the stator and then to assemble them. Accordingly, the assembling working including winding operation requires much time for completion of assembling in comparison with a usual rotating electrical machine having axial linear air-gap, which results in the increasing in manufacturing cost.

The present invention was conceived to solve such defects.

Incidentally, there has also been provided an axial-gap type rotating electrical machine having air-gap in the axial direction. However, such rotating electrical machine has a possibility of causing surface blurring due to plane opposing arrangement, and hence, it is difficult to make small the air-gap as in the radial-gap type structure. Because of this reason, in comparison with the radial-gap type, the axial-gap type is inferior to the radial-gap type in the realization of high efficiency and high torque. In such viewpoint, the axial-gap type rotating electrical machine has not been developed as compared with the radial-gap type other than a specific use case of a flat motor or a motor which less stops the operation and weights on a constant revolution. The present invention was conceived to solve such defect.

Since a coil end portion in the concentrated winding type structure is small in comparison with distributed winding type structure, copper loss is reduced and achieves high efficiency. However, in order to further improve the efficiency, it is required to positively utilize a sectional area occupied by the coil end portion which does not constitute an opposing area to the rotor. There has been proposed one countermeasure in which winding pole shape of the stator is formed so as to protrude in an axial direction or circumferential direction in rotation, which is so-called as overhang shape, thus forming a dust core.

In the lamination method of silicon steel plates, the adoption of such overhang structure is generally considered to be difficult or to involve increased cost, and accordingly, the dust core which is capable of being three-dimensionally compacted. The dust core is formed in a manner such that a small amount of resin is coated to a soft magnetic iron powder as a binder, and is mixed for the purpose of insulating eddy current, and after the compression compacting, is sintered.

Although the silicon steel plate lamination method provides a simple two-dimensional shape, in the above method, it is possible to adopt a three-dimensional complicated shape, and in addition, eddy current loss as a part of copper loss becomes small, being advantageous. Further, although the dust core mentioned above has a defect of having magnetic flux less than that of silicone steel plate, it is applicable for realizing high efficiency because of increased opposing area to a rotor by adopting the overhang structure.

The present invention can remarkably achieve the effect of the dust core by using the same. Further, it is necessary to increase a winding space factor in order to achieve high efficiency. In the concentrated winding type, since the winding is directly wound in a slot through an opening portion by means of nozzle, the space factor of the winding is about 20 to 30%. According to a split-type dust core according to one embodiment of the present invention, dynamic winding space factor, which is never obtained by the lamination type, can be realized.

Means for Solving the Problem

The present invention is realized by the following means.

[Means 1]

There is provided a rotating electrical machine of axial-gap type in which a stator and a rotor are opposed to each other in arrangement and winding axis is parallel with a rotating shaft direction, wherein the stator having "m" ("m" is an integer more than 2 (not less than 2)) winding poles protruding in the rotating shaft direction are distributed along a circumferential direction thereof, in which the winding pole is formed of a magnetic member having a plurality of teeth in a circular-arc shape in a diameter direction, and wherein the rotor is formed of a magnetic member having a plurality of teeth in a circular-arc shape in a diameter direction, and the teeth of the stator and the teeth of the rotor are arranged in a manner opposite to each other through air gap so as to be engaged with each other.

[Means 2]

In the rotating electrical machine according to the above means 1, the stator and the rotor are opposed not only on one side but also on both sides of the rotor.

[Means 3]

In the rotating electrical machine according to the above means 1, the stator and the rotor are opposed not only on one side but also on both sides of the stator.

[Means 4]

In the rotating electrical machine according to the above means 1 or 2, the rotor is composed of two rotors formed of magnetic members in which a permanent magnet magnetized in two poles in the axial direction is clamped and maintained in a sandwiched manner by two rotors, the magnetic member being provided with a plurality of teeth in a concentric manner in the diameter direction.

[Means 5]

In the rotating electrical machine according to the any one of above means 1 to 3, the rotor composed of 2p (p is integer number) rotor pieces formed from magnetic member having a plurality of teeth in a concentric manner in the diameter direction is arranged to and magnetized by a permanent magnet magnetized in 2p poles in which N- and S-poles are alternately arranged in a circumferential direction.

[Means 6]

In the rotating electrical machine according to any one of the above means 1 to 5, at least the stator is composed of a dust core, and as occasion demands, and the stator is composed of split cores, each of which has an overhang structure, and which are then assembled integrally after winding.

[Means 7]

In the rotating electrical machine according to the above means 3, the stator is composed of "m" (m is integer) dust cores each formed with a winding groove at a central portion in an axial thickness direction.

[Means 8]

In the rotating electrical machine according to any one of the above means 1 to 7, the rotor is composed of a dust core.

[Means 9]

In the rotating electrical machine according to any one of the above means 6 to 8, the dust core is subjected to either one of resin coating and resin impregnation treatment, or both treatments.

Effects of the Invention

1) Since the air-gap opposing portions between the stator teeth and the rotor teeth are engaged with each other, the opposing area is increased, there can be realized a rotating electric machine, with high efficiency, having a large permeance of the air-gap portion.

2) Since, in an axial gap type rotating electrical machine, the teeth of the stator and rotor are engaged in a concentric circular-arc shape, there can be provided a rotating electrical machine cheaply manufactured with high efficiency, in which the rotor is rotatable through the air gap, and easily assembled by inserting the rotating shaft of the rotator into the bearing of the stator.

3) A rotating electrical machine having compact structure and having high efficiency can be provided by arranging the starts on both sides of the rotor or by arranging the rotor on both sides of the stator.

4) A permanent magnet may be used for the rotor, and in such case, further high efficiency could be realized.

5) According to the adoption of the overhang structure of the dust core, the opposing area to the rotor is increased in comparison with the lamination type structure, and the length of the winding can be shortened, so that the copper loss can be reduced and high torque and high efficiency can be realized.

6) Due to the dust core, the eddy current loss becomes nearly zero, and in particular, the iron loss at the high-speed operation is reduced, leading to the production of the rotating electrical machine having high efficiency.

7) Since the integration of the split core is performed by means of welding, the working becomes easy and the core provides rigidity, and in addition, since the compacted powders are directly welded together, the magnetic resistance at the junction portion can be reduced, thus providing a rotating electrical machine having high performance with reduced manufacturing cost.

8) In a case where the integration of the split core is performed by means of resin mold, since the welding and cylindrical member can be utilized together, thus providing a rotating electrical machine having high rigidity and reliability.

9) By using the overhang type split core, the opening between slots can be made small, cogging torque can be also made small, leading to reduced vibration and noise.

10) It is necessary for the surface pressure to the dust core to be about 800 MPa, and in order to make an iron core having large diameter, it is required to prepare a pressing machine having large power corresponding to projection area thereof, requiring an expensive equipment cost. However, in the use of the split core into "m" pieces provides a projection area of 1/m, thus reducing a cost for preparing a pressing equipment.

DESCRIPTION OF THE PREFERRED EMBODIMENT

Mode for Embodying the Invention

The present invention will be described hereunder with reference to the accompanying drawings.

Figure 1:
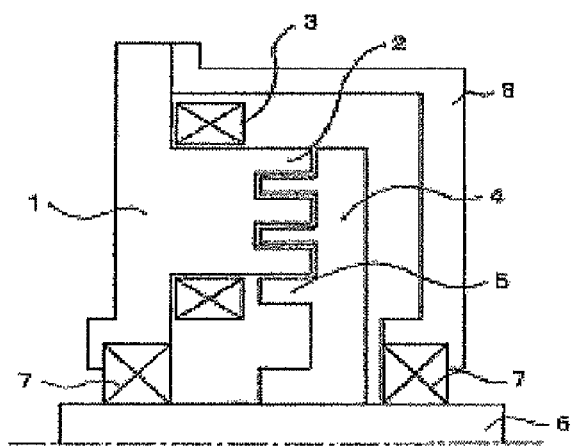
FIG. 1 is a sectional view of one example of a rotating electrical machine, including a rotating shaft thereof, according to the present invention.

FIG. 1 shows one example illustrating a structure of the present invention, which is an axial-gap type rotating electrical machine and is an example using no permanent magnet for a rotor and corresponding to a case of an SR motor or variable reluctance type stepping motor (called hereunder "VR type STM) generating rotating torque only by using magnetic attractive force.

Figure 2:
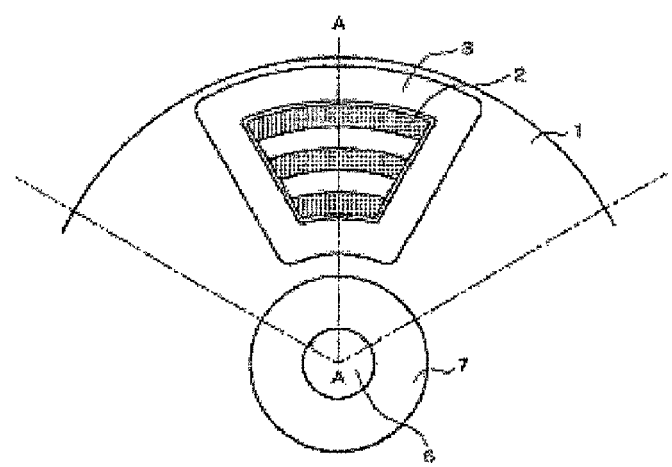
FIG. 2 is a view showing a stator of the rotating electrical machine of FIG. 1 as viewed form an axial direction thereof.
Figure 3:
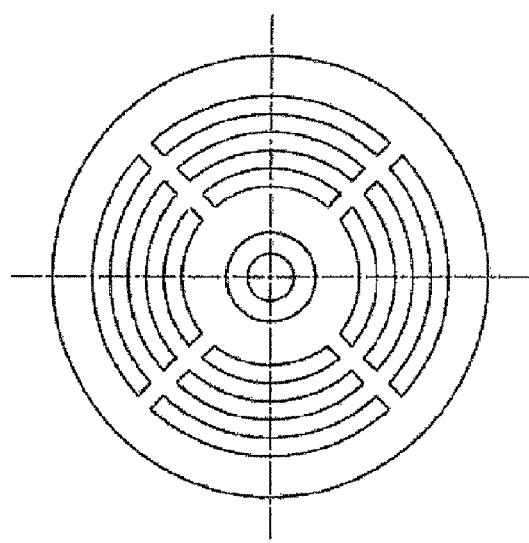
FIG. 3 is a view showing a rotor of the rotating electrical machine of FIG. 1 as viewed form an axial direction thereof.

FIG. 2 is a view of the stator shown in FIG. 1 and viewed from the axial direction thereof, and FIG. 3 is a view showing the rotor viewed from the axial direction thereof.

With reference to FIGS. 1 to 3, one embodiment of the present invention will be described hereunder, in which reference numeral 1 denotes a stator 1 formed of a magnetic member, having six winding poles which protrude in the axial direction and have tip end portions to which teeth 2 are formed, three teeth 2 being provided in the diametrical direction in concentric arc-shaped manner. The number of the teeth 2 is not limited three and a plurality of teeth may be provided.

The reference numeral 3 denotes a winding, which is provided for six winding poles protruding in the axial direction, and in this structure, arranged on the left side in the axial direction of the teeth 2. The reference numeral 4 is a rotor formed of a magnetic material and fixed to a rotating shaft 6 to be rotatable by means of bearing 7. A portion of the rotor 4 opposing to the stator in the axial direction is formed to be concentric circular-arc portion 5.

The reference numeral 8 is a structural member called bracket, which is secured to the stator 1 so as to support the rotating shaft 6 by means of the bearing 7 together with the stator 1.

As mentioned above, one embodiment of the present invention constitutes an axial-gap type rotating electrical machine. According to the structure mentioned above, a rotating electrical machine having the following merits and/or advantages will be provided.

That is, according to the described structure, since an air-gap opposing portion between the stator teeth and the rotor teeth constitutes engaged opposing state, the opposing are can be increased, and permeance of the air-gap portion can be increased, thereby realizing a rotating electrical machine having high efficiency. This is because, although most part of magnetomotive force passing through magnetic flux is consumed in the air-gap, since the permeance of the air-gap portion can be made larger, the consumption of the magnetomotive force at this portion is reduced.

Moreover, in the axial-gap type rotating electrical machine, since the concentric circular-arc-shaped engagement between teeth of the stator and the rotor is performed, the rotor can be easily assembled by inserting the shaft of the rotor into the bearing of the stator, thus providing a rotating electrical machine at reduced cost with high efficiency.

In such case, the shape of the teeth is not limited to the illustrated rectangular one, and triangular shape or circular-arc-shaped curve may be adopted as long as the opposing area is increased than a case of plane opposing area and the engaged structure is rotatable in the circumferential direction. In this occasion, it is difficult for the lamination type by silicon steel plates to manufacture the teeth portions, but the manufacturing thereof can be easily performed by the compacted powder. Furthermore, the present invention is not limited to six pole structure, and in a practical use, two-, four-, eight- and twelve-winding poles for two-phase structure are desirable; six-, nine- and twelve-winding poles for three-phase structure are desirable; and five- and ten-winding poles for five-phase structure are desirable. In general, the number "m" of the stator poles is a positive integer more than 2 (not less than 2). Further, although the number of the rotor poles is four in the example shown in FIGS. 1 to 3, but the same assembling of the poles as that in the radial-gap type SR motor and the VR-type STM may be adopted.

Figure 4:
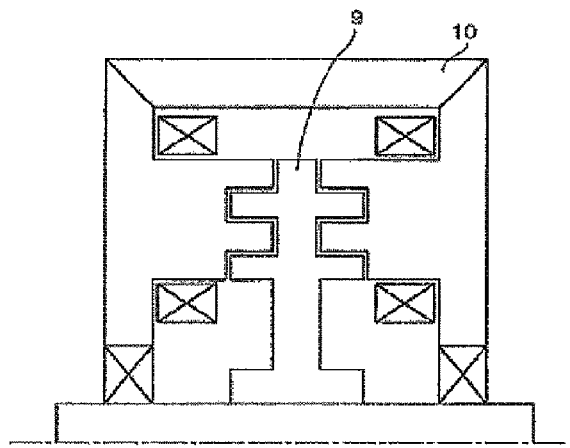
FIG. 4 is a view illustrating the rotating electrical machine in which the stator is provided on both sides of the rotor.

FIG. 4 represents another one example of the present invention, which is similar to that shown in FIGS. 1 to 3 in the basic structure, but the teeth engagement portions are formed by locating the stator on both sides of the rotor, and because of this arrangement, the rotor 9 has teeth on both sides thereof. Portions or parts other than the above structure is substantially the same as those shown in FIGS. 1 to 3, the explanations thereof will be omitted herein, but the right and left stators are coupled and fixed by means of a housing denoted by the reference numeral 10. According to such structure, a small and compact rotating electrical machine having high efficiency can be provided.

Figure 5:
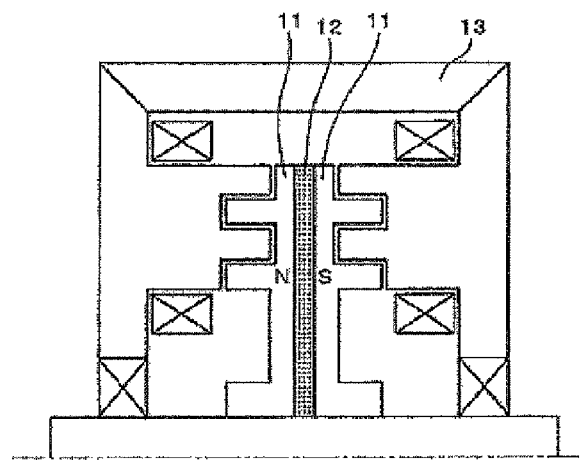
FIG. 5 is a view illustrating the rotating electrical machine in which the stator is provided on both sides of the rotor according to another embodiment of the present invention.

Although the stator shown in FIG. 5 has the same structure as that shown in FIG. 4, the rotor is different. That is, two rotors each being formed of a magnetic material and having the teeth identical to that of the rotor shown in FIG. 1 so as to clamp the permanent magnet magnetized in the axial direction thereof. In this structure, the magnetic flux generated from the N-pole of the permanent magnet passes through the left side rotor 11, then passes through the left side stator, passes through the right side stator through the housing 13 formed of magnetic material, passes through the right side rotor 11, and then returns to the S-pole of the permanent magnet, thus constituting a closed magnetic passage. This structure is constituted as a permanent magnet type rotating electrical machine such as STM or BLD motor which performs further high efficiency in comparison with the structure shown in FIGS. 1 and 4.

Figure 6:
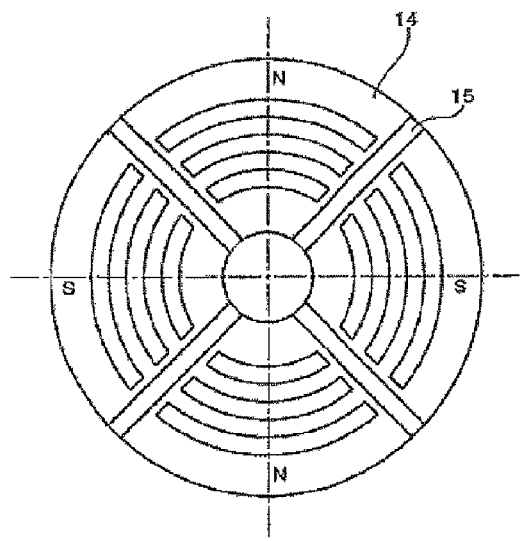
FIG. 6 is an illustration showing a split-type core structure of a rotor according to one example of the present invention.
Figure 7:
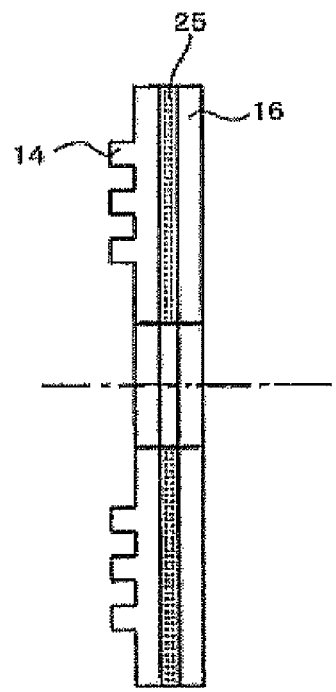
FIG. 7 is an illustration showing a split-type core structure of a rotor, including a shaft, according to one example of the present invention, which is provided with a split permanent magnet and a back yoke.

FIG. 6 shows a structural view of a rotor core in a case when the rotor shown in FIGS. 1 to 3 is composed as a permanent magnet type rotating electrical machine such as BLD motor. In this case, a rotor core 14 in FIG. 6, with respect to that shown in FIG. 3, is split into four parts which are arranged at a certain interval between adjacent ones, and arranged in close contact to one sheet of permanent magnet 15 magnetized with N- and S-poles, alternately, on the side opposite to the opposing side of the stator. Otherwise, as shown in FIG. 7, it may be possible to provide a structure in which a permanent magnet 25 is split into four pieces having substantially the same opposing areas, respectively, and magnetized in the axial direction in the thickness direction to thereby provide four poles. In this arrangement, magnetic flux amount of the permanent magnet is increased by using a back yoke denoted by reference numeral 16.

The rotor shown in FIG. 7 is utilized in combination of the stator shown in FIG. 1.

Further, in substitution for the permanent magnet 15 shown in FIG. 6, the rotor core 14 may be magnetized so as to provide four poles having alternately arranged N- and S-poles in the circumferential direction at the time of arranging the four rotor core 14 in the circumferential direction and at the time of inserting the permanent magnet into a gap caused in a thick portion in the axial direction of the rotor core 14.

Generally speaking, the rotors shown in FIGS. 6 and 7 are rotors each formed by arranging, in circular-arc shape, and magnetizing 2p (number) rotor pieces having a plurality of teeth in the diameter direction to the permanent magnet magnetized so as to provide 2p poles alternately N- and S-poles. Further, since the number of the poles is always even number, the number "p" is positive integer, and in a case of p=2, the number of poles is four (4).

Figure 8:
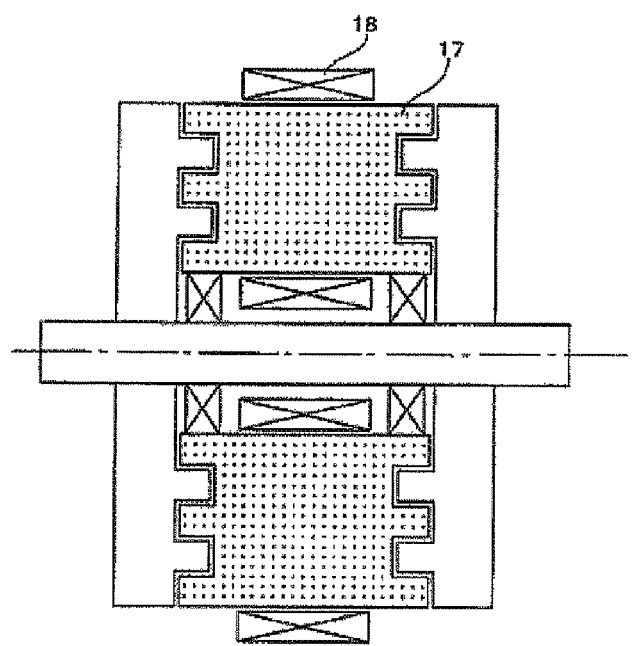
FIG. 8 is a view illustrating the rotating electrical machine in which the rotor is provided on both sides of the stator.

FIG. 8 is a view illustrating a structure in which the teeth are provided on both sides of the stator and the rotor so as to be opposite to the stator teeth. The reference numeral 17 denotes a stator, which is formed with concentric circular-arc-shaped teeth arranged on both side in the axial direction thereof. For example, in a case when six stators 17 are arranged, they are arranged with an interval of 60 degrees between adjacent ones and the windings 18 are then arranged and fixed by means of resin mold to thereby form the stator. In this arrangement, the rotating electrical machine can provide compact structure and achieve high efficiency in comparison with the structure represented by FIG. 1. It is difficult to adopt this structure for the silicon steel plate lamination method for manufacturing the stator 17, but it can be easily manufactured by using the compacted powder.

Figure 9:
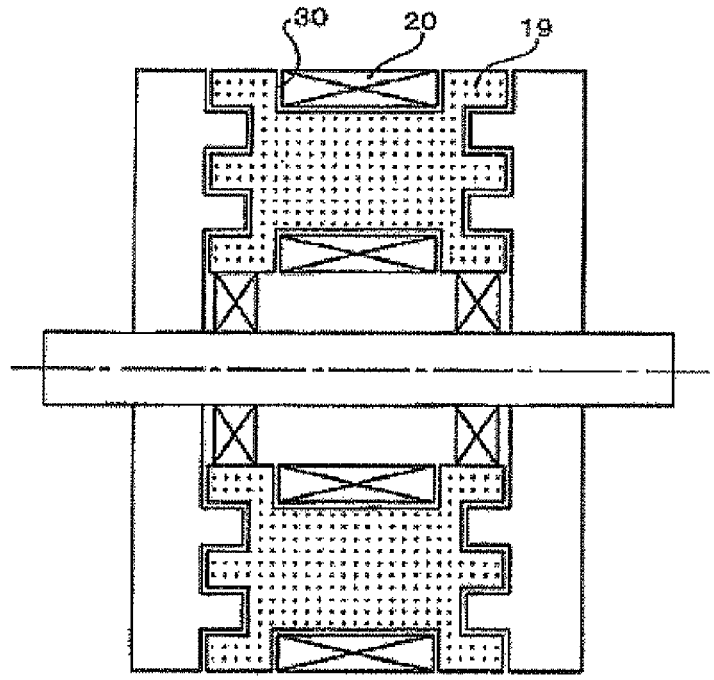
FIG. 9 is a view illustrating the rotating electrical machine in which the stator is provided on both sides of the rotor according to another embodiment of the present invention.

FIG. 9 shows an arrangement in which a winding groove 30, so-called overhang portion, is provided for the stator core 17 shown in FIG. 8 to thereby accommodate the winding 20 in the groove. According to this structure, the winding portion does not protrude outward over the outer periphery of the stator 17 as shown in FIG. 8, thus providing further compact structure. In this case, the dust core can be produced by using a compacting by splitting into two parts at the central portion in the axial length direction of the winding of the stator.

Further, although it is desired to form the stator winding portion at the central portion, it may be made to form the stator winding to an upper side (left side in FIG. 9) or a lower side (right side in FIG. 9) so as to straddle the central portion according to the using specification of the rotating electrical machine, or the winding may be split or divided into a plurality of parts to be arranged separately. Further, in this structure, when the permanent magnet type rotor, which is mentioned hereinbefore with reference to FIGS. 6 and 7, is arranged oppositely on both side of the stator, further high efficiency can be achieved for the rotating electrical machine.

Figure 10:
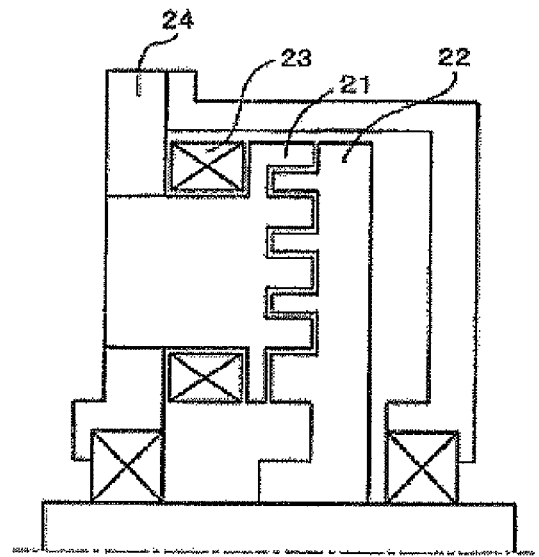
FIG. 10 is an illustration showing a split-type core structure of a rotor according to another example of the present invention.

FIG. 10 is a view illustrating a state in which the stator of FIG. 1 is manufactured by using the dust core. The stator 21 in FIG. 10 has an overhang structure in which the winding portion is made smaller than the teeth outer peripheral portion so that the winding is disposed inside the outer periphery of the stator teeth portion. In this structure, the stator 21 is split into six parts, which are then magnetically coupled or joined mechanically by using a magnetic plate 24 or like after the winding, or through not shown, the six split parts may be joined or integrated in the circumferential direction by providing a flanged portion to the stator 21 so as to have a shape and attain function as the magnetic plate 24. This joining process will be performed by welding, adhesion, resin molding process or like. With the structure in FIG. 10, if the rotor is substituted with the rotor shown in FIG. 6 or FIG. 7, there may be provided an STM or s BLDC motor as a permanent magnet type rotating electrical machine having further high efficiency.

Figure 11:
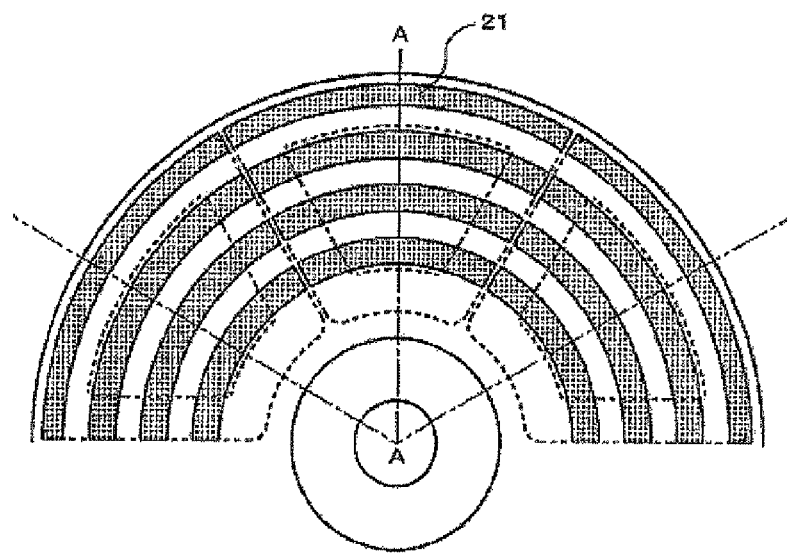
FIG. 11 is a view showing the stator of FIG. 10 as viewed from the axial direction.

FIG. 11 is a view illustrating a stator portion after the joining from the axial direction thereof. In this structure, it will be found out that the interval in the circumferential direction of the stator core narrows in comparison with the structure shown in FIG. 2. Thus, the opposing area to the rotor increases, the split slot width of the core narrows, and cogging is made small, which results in low vibration and low noise generation, thus being effective.

Figure 12:
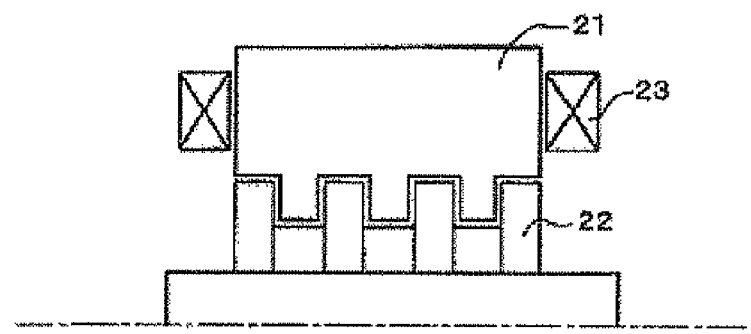
FIG. 12 is a view illustrating a structure of a conventional rotating electrical machine.

FIG. 12 is a view showing a conventional structure corresponding to FIG. 12 of the Patent Document 1. In the structure of FIG. 12, reference numeral 21 denotes a stator, reference numeral 22 denotes a rotor, and reference numeral 23 is winding wound around the rotor. However, in this structure, an air-gap is not developed linearly in the rotating shaft direction, and a rotating electrical machine is constructed through the engagement of the protruded portion and the recessed portion.

According to the structure mentioned above, the actual opposing area of the air gap is increased, leading to realization of high efficiency and high torque of the rotating electrical machine. However, in this rotating electrical machine, since the air gap is not linearly provided, the rotor separately formed from the stator cannot be inserted into the stator to be assembled. Because of this reason, in comparison with a usual air-gap type rotating electrical machine, in which the air gap is formed linearly in the axial direction, this type rotating electrical machine requires much time and cost for the completion of assembling working including winding working, which may result in yield during the working and causes unexpected accident leading to problem in reliance of product.

Figure 13:
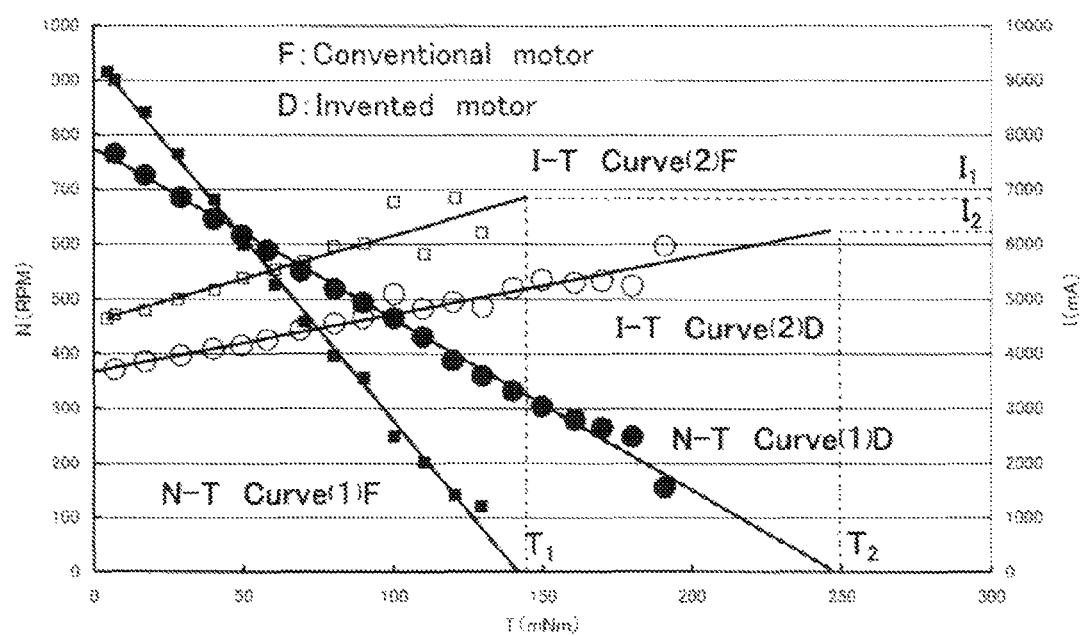
FIG. 13 is graph representing a comparison result in evaluation between a product according to the present invention and a conventional structure.

FIG. 13 is a graph showing results of a test performed by a rotating electrical machine according to the present invention, and more specifically, a brushless motor having six winding stator poles (m=6) and permanent magnet rotor poles (n=4) was manufactured, and the load torque characteristics—speed-and-load torque characteristics—and current were measured for the comparison with a conventional product.

The product of the present invention was the axial gap motor in which an air-gap is formed in engagement of the protruded and recessed portions, whereas the conventional product was one having the same motor size and structure only with different air-gap structure in which the stator pole and the rotor pole are opposed in a plane as is conventional one, and the air-gap length in the axial direction was the same in both the present invention and conventional one. The comparison was performed under the conditions mentioned above.

FIG. 13 represents the result of comparison between the present invention and the conventional one in terms of (1) load torque-speed curve and (2) load torque-current curve. For example, as to so-called torque constant obtained by dividing the maximum torque value at which the speed becomes zero at the load torque-current curve (1) with current value obtained by the (2) load torque-current speed was ($T_2/I_2$=250 mNm/6.2 A) in the product of the present invention, and on the other hand, ($T_1/I_1$=141 mNm/6.82 A) in the conventional product. Accordingly, the torque constant ratio becomes 1.95 times, from which it was evidenced that the torque constant ratio could be improved by about two times in comparison with the conventional product.

In the rotating electrical machine according to the present invention of the characters and structures mentioned above, the dust core may be preferably subjected to either one of the resin coating and resin impregnation treatments, or both treatments for the improvement in strength and durability thereof. For performing such treatments, the method is not limited to the specific one, and any other method may be adopted as long as the surface of the dust core can be coated with resin, and/or resin can be impregnated deeply inside the dust core. More specifically, electrodepositing method, electrostatic coating method, dipping method or the like may be adopted. Moreover, as to the resin to be used, the resin is not limited to specific one, and various resins may be selectively used. Furthermore, in the case of the dipping method, dipping solution including a liquid type adhesive agent or vanish which is generally used may be used.

As mentioned hereinbefore, the axial-gap type rotating electrical machine of the present invention is applied as it is to an electric motor, electric generator or like and is capable of reducing manufacturing cost, providing rigid, compact and thin structure and performing high efficiency, thus being extremely suitable for practical use, and being expected in industrial contribution.

What is claimed is:

1. A rotating electrical machine of axial-gap type in which a stator and a rotor are opposed to each other in arrangement and winding axis is parallel with a rotating shaft direction, wherein the stator having "m" ("m" is an integer more than 2 (not less than 2)) winding poles protruding in the rotating shaft direction are distributed along a circumferential direction thereof, in which the winding pole is formed of a magnetic member having a plurality of teeth in a circular-arc shape in a diameter direction, and wherein the rotor is formed of a magnetic member having a plurality of teeth in a circular-arc shape in a diameter direction, and the teeth of the stator and the teeth of the rotor are arranged in a manner opposite to each other through air gap so as to be engaged with each other.

2. The rotating electrical machine according to claim 1, wherein the stator and the rotor are opposed not only on one side but also on both sides of the rotor.

3. The rotating electrical machine according to claim 1, wherein the stator and the rotor are opposed not only on one side but also on both sides of the stator.

4. The rotating electrical machine according to claim 3, wherein the stator is composed of "m" (m is integer) dust cores each formed with a winding groove at a central portion in an axial thickness direction.

5. The rotating electrical machine according to claim 1, wherein the rotor is composed of two rotors formed of magnetic members in which a permanent magnet magnetized in two poles in the axial direction is clamped and maintained in a sandwiched manner by two rotors, the magnetic member being provided with a plurality of teeth in a concentric manner in the diameter direction.

6. The rotating electrical machine according to claim 1, wherein the rotor composed of 2p (p is integer number) rotor pieces formed from magnetic member having a plurality of teeth in a concentric manner in the diameter direction is arranged to and magnetized by a permanent magnet magnetized in 2p poles in which N- and S-poles are alternately arranged in a circumferential direction.

7. The rotating electrical machine according to claim 1, wherein at least the stator is composed of a dust core, and as occasion demands, and the stator is composed of split cores, each of which has an overhang structure, and which are then assembled integrally after winding.

8. The rotating electrical machine according to claim 7, wherein the dust core is subjected to either one of resin coating and resin impregnation treatment, or both treatments.

9. The rotating electrical machine according to claim 1, wherein the rotor is composed of a dust core.

* * * * *